United States Patent [19]

Reich et al.

[11] Patent Number: 4,969,628
[45] Date of Patent: Nov. 13, 1990

[54] VALVE CONSTRUCTION AND METHOD OF MAKING THE SAME

[75] Inventors: Richard B. Reich, Midlothian, Va.; George W. Feild, Crofton, Md.

[73] Assignee: Robertshaw Controls Company, Richmond, Va.

[21] Appl. No.: 439,599

[22] Filed: Nov. 20, 1989

[51] Int. Cl.$^5$ ............................................. F16K 31/04
[52] U.S. Cl. .............................. 251/122; 251/129.05; 251/129.11; 251/217
[58] Field of Search .................... 251/129.11, 122, 217, 251/129.05

[56] References Cited

U.S. PATENT DOCUMENTS

| | | | |
|---|---|---|---|
| 1,538,912 | 5/1925 | Taylor | 251/217 |
| 3,831,900 | 8/1974 | Matousek et al. | 251/122 |
| 4,452,423 | 6/1984 | Beblavi et al. | 251/129.11 X |
| 4,495,779 | 1/1985 | Tanaku et al. | 62/211 |
| 4,523,435 | 6/1985 | Lord | 62/212 |
| 4,593,881 | 6/1986 | Yoshino | 251/129.11 X |
| 4,609,176 | 9/1986 | Powers | 251/129.11 X |
| 4,745,767 | 5/1988 | Ohya et al. | 62/211 |
| 4,763,874 | 8/1988 | Ogawa | 251/129.11 X |

FOREIGN PATENT DOCUMENTS 0186681 11/1982 Japan ............................... 251/129.11

Primary Examiner—Arnold Rosenthal
Attorney, Agent, or Firm—Candor, Candor & Tassone

[57] ABSTRACT

A valve construction and method of making the same are provided, the valve construction comprising a housing having an inlet and an outlet and a valve seat adapted to be interconnected to the inlet and the outlet, a movable valve member carried by the housing and being operatively associated with the valve seat to control fluid flow therethrough from the inlet to the outlet, and a stepper motor carried by the housing and being operatively interconnected to the movable valve member to move the movable valve member relative to the valve seat to control the fluid flow through the valve seat, the movable valve member comprising a flexible part for sealing closed the valve seat when the stepper motor moves the flexible part against the valve seat and a throttlling part extending beyond the flexible part and into the valve seat to throttle the fluid flow therebetween when the stepper motor has moved the flexible part away from the valve seat and the throttling part has a portion thereof disposed in the valve seat.

8 Claims, 2 Drawing Sheets

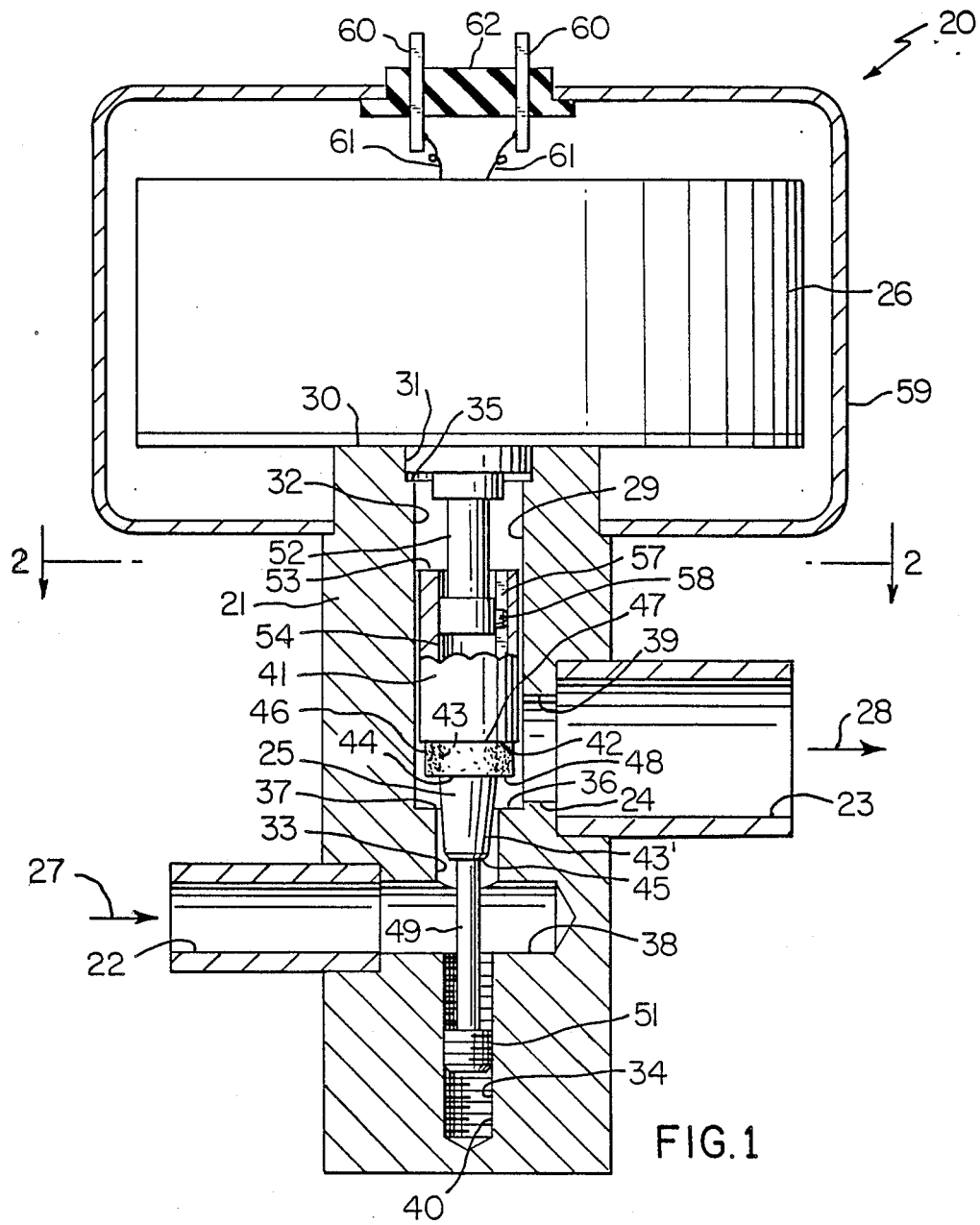
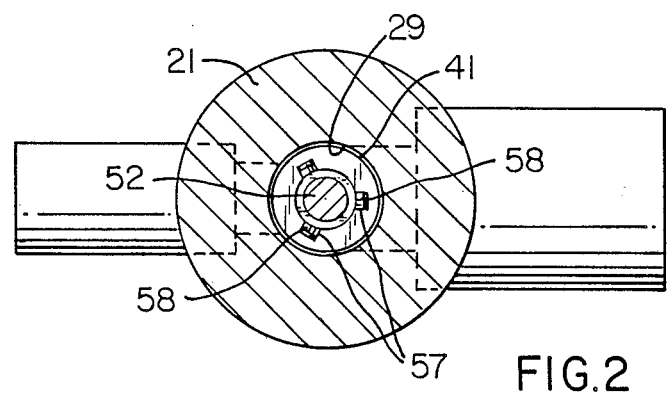

4,969,628

VALVE CONSTRUCTION AND METHOD OF MAKING THE SAME

BACKGROUND OF THE INVENTION

1. Field of the Invention

This invention relates to a new valve construction and to a new method of making such a valve construction.

2. Prior Art Statement

It is known to provide a valve construction comprising a housing means having an inlet and an outlet and a valve seat means adapted to interconnect the inlet with the outlet, a movable valve means carried by the housing means and being operatively associated with the valve seat means to control fluid flow therethrough from the inlet to the outlet, and moving means carried by the housing means and being operatively interconnected to the movable valve means to move the movable valve means relative to the valve seat means to control the fluid flow through the valve seat means, the moving means comprising an electrically operated stepper motor and the valve construction comprising an expansion valve construction for a refrigerant system. For example, see the Ohya et al, U.S. Pat. No. 4,745,767; the Lord U.S. Pat. No. 4,523,435 and the Tanaka et al, U.S. Pat. No. 4,495,779.

SUMMARY OF THE INVENTION

It is one feature of this invention to provide a new valve construction having unique means for sealing closed a valve seat means while permitting accurate throttling flow through such valve seat means when opened without having the throttling parts adversely affected when the valve seat means is closed.

In particular, it was found according to the teachings of this invention that when a tapering valve member is utilized to throttle fluid flow through an open circular opening of a valve seat means and that tapering part is utilized to seal the opening of the valve seat means in its closed condition, the tapering valve member tends to stick in its closed condition through the wedging relation thereof with the valve seat means so that a relatively large force is required to unseat the valve member and such large force is particularly difficult to provide when the moving means for moving the valve member comprises an electrically operated stepper motor.

Further, it was found according tot he teachings of this invention that such adverse wedging action is particularly noticeable when the meteriing or tapering portion of the valve member is relatively long and gradual, such long and gradual structure having been found to be particularly desirable for controlling the flow of a refrigerant through an expansion valve.

Accordingly, it was found according to the teachings of this invention that the above adverse conditions can be eliminated or substnatially reduced by forming the movable valve member so as to have a flexible or soft part for sealing against a valve seat means to close the same and to have a throttling part that extends beyond the flexible part and into the valve seat means for controlling the fluid flow therebetween when the flexible part is moved away from the valve seat and the throttling part still has a portion thereof disposed in the valve seat.

For example, one embodiment of this invention comprises a valve construction comprising a housing means having an inlet and an outlet and a valve seat means adapted to interconnect the inlet with the outlet, a movable valve means carried by the housing means and being operatively associated with the valve seat means to control fluid flow therethrough from the inlet to the outlet, and moving means carried by the housing means and being operatively interconnected to the movable valve means to move the movable valve means relative to the valve seat means to control the fluid flow through the valve seat means, the movable valve means comprising a flexible part for sealing closed the valve seat means when the movable means moves the flexible part against the valve seat means and a throttling part extending beyond the flexible part and into the valve seat means to throttle the fluid flow therebetween when the movable means has moved the flexible part away from the valve seat means and the throttling part has a portion thereof disposed in the valve seat means.

It is another feature of this invention to provide the movable valve means of a valve construction, wherein a stepper motor is operatively interconnected to a movable valve member to move the same relative to its valve seat means, with unique means for maintaining the valve member in the position thereof at which it was last set by the stepper motor when the power to the stepper motor has been removed.

In particular, it was found according to the teachings of this invention that the movable valve means can have a stem extending therefrom and be threadedly interconnected to the housing means in such a manner that rotation of the valve means by the stepper motor causes axial movement of the valve means relative to the valve seat means through the threaded relation of the stem with the housing means.

For example, another embodiment of this invention comprises a valve construction comprising a housing means having an inlet and an outlet and a valve seat means adapted to interconnect the inlet with the outlet, a movable valve means carried by the housing means and being operatively associated with the valve seat means to control fluid flow therethrough from the inlet to the outlet, and an electrically operated stepper motor means carried by the housing means on one side of the valve seat means and being operatively interconnected to the movable valve means to move the movable valve means relative to the valve seat means to control the fluid flow through the valve seat means, the movable valve means having a stem extending therefrom and being threadedly interconnected to the housing means on the other side of the valve seat means whereby rotation of the valve means by the stepper motor means causes axial movement of the valve means relative to the valve seat means through the threaded relation of the stem with the housing means.

It is another feature of this invention to provide means to maintain a center alignment of a tapering valve portion of a movable valve means in the opening of a valve seat so as to provide for an accurate flow rate of fluid therebetween at each axial position of the tapering valve portion.

In particular, it was found according to the teachings of this invention that the housing means that carries the movable valve means can have means on each side of the valve seat means thereof to tend to center the movable valve means in each axial position thereof.

For example, another embodiment of this invention comprises a valve construction comprising a housing means having an inlet and an outlet and a valve seat means adapted to interconnect the inlet with the outlet, a movable valve means carried by the housing means and being operatively associated with the valve seat means to control fluid flow therethrough from the inlet to the outlet, the movable valve means having a throttling part disposed into the valve seat means to throttle fluid flow therebetween, and moving means carried by the housing means on one side of the valve seat means and being operatively interconnected to the movable valve means to axially move the movable valve means relative to the valve seat means to control the fluid flow through the valve seat means, the movable valve means being operatively associated with a first section of the housing means on the one side of the valve seat means to tend to center the throttling part of the movable valve means relative to the valve seat means, the movable valve means having a stem extending from the throttling part and being operatively associated with a second section of the housing means on the other side of the valve seat means whereby the first and second sections of the housing means tend to center the throttling part relative to the valve seat means during the axial movement of the valve means relative to the valve seat means by the moving means.

Accordingly, it is an object of this invention to provide a new valve construction having one or more of the novel features of this invention as set forth above or hereinafter shown or described.

Another object of this invention is to provide a new method of making such a valve construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a cross-sectional view of the new valve construction of this invention and illustrates the movable valve means thereof disposed in one operating position thereof.

FIG. 2 is a cross-sectional view taken on line 2—2 of FIG. 1.

DESCRIPTION OF THE PREFERRED EMBODIMENT

Figure 3:
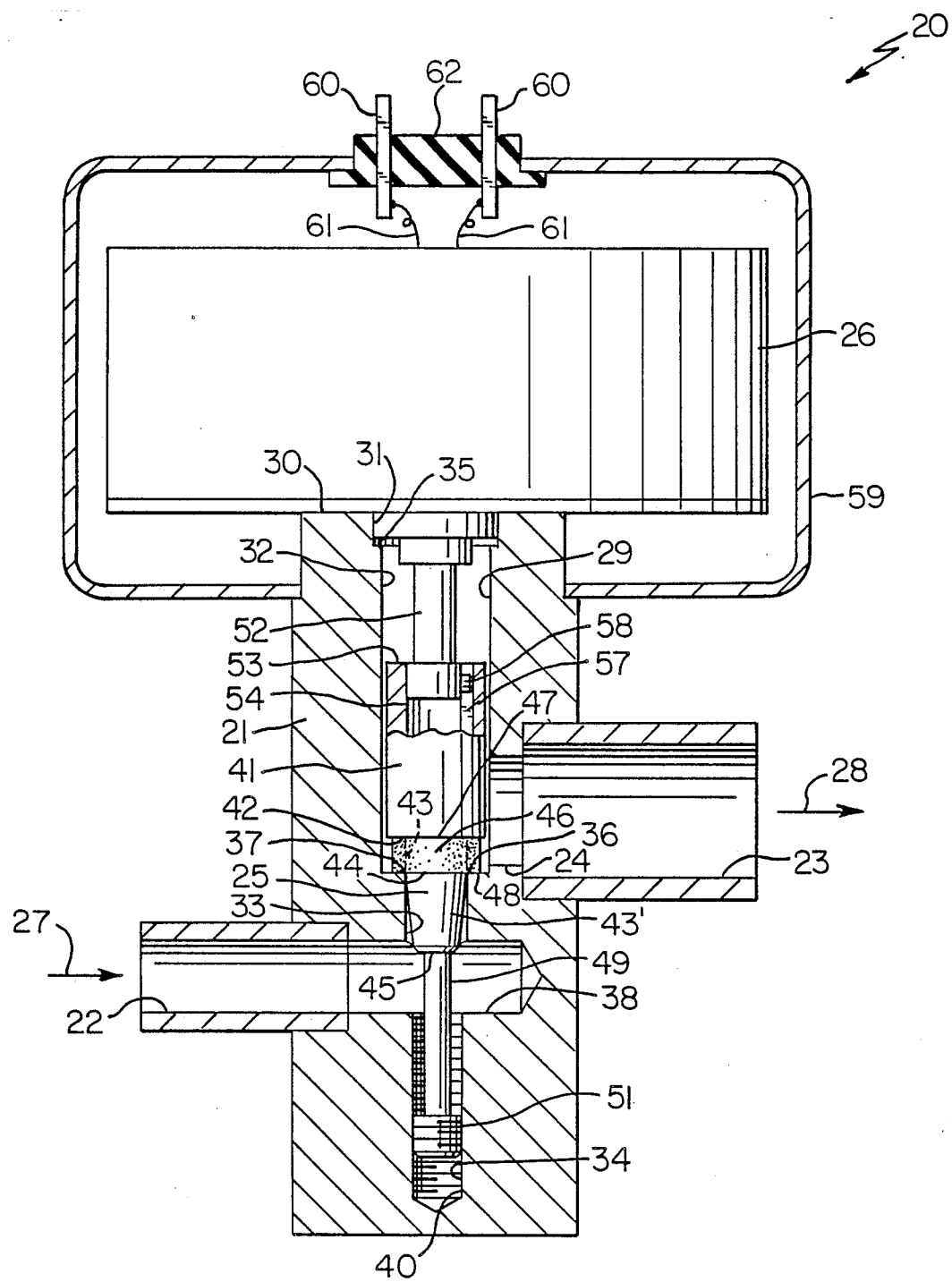
FIG. 3 is a view similar to FIG. 1 and illustrates the movable valve means of the valve construction in its closed condition.

While the various features of this invention are hereinafter described and illustrated as being particularly adapted to provide an expansion valve construction for a refrigerant system, it is to be understood that the various features of this invention can be utilized singly or in various combinations thereof to provide a valve construction for other uses and systems, as desired.

Therefore, this invention is not to be limited to only the embodiment illustrated in the drawings, because the drawings are merely utilized to illustrate one of the wide variety of uses of this invention.

Referring now to FIGS. 1–3, the new valve construction of this invention is generally indicated by the reference numeral 20 and comprises a housing means 21 having an inlet means 22 and an outlet means 23 and a valve seat means 24 adapted to interconnect the inlet means 22 with the outlet means 23, a movable valve means 25 carried by the housing means 21 and being operatively associated with the valve seat means 24 to control fluid flow therethrough from the inlet means 22 to the outlet means 23, and a moving means 26 operatively interconnected to the movable valve means 25 to move the movable valve means 25 relative to the valve seat means 24 to control the fluid flow through the valve seat means 24.

For example, the valve construction 20 can comprise an expansion valve construction for a refrigerant system wherein the inlet means 22 is interconnected to a refrigerant inlet pipe 27 and the outlet means 23 is interconnected to a refrigerant outlet pipe 28 so that the moving means 26 through positioning the movable valve means 25 relative to the valve seat means 24 is adpated to provide a desired degree of superheat all in a manner that is well known in the art. For example, see the aforementioned Ohya et al, U.S. Pat. No. 4,745,767, Lord U.S. Pat. No. 4,523,435 and the Tanaka et al, U.S. Pat. No. 4,495,779 whereby these three U.S. patents are being incorporated into this disclosure by this reference thereto.

Therefore, since the reasons for utilizing an expansion valve construction in a refrigerant system, as well as the details of the operation thereof, are all well known in the art, a further discussion of the valve construction 20 of this invention in a refrigerant system as an expansion valve means therefor need not be further set forth.

Also, it is to be understood that the outlet means 23 could be an inlet means and that inlet means 22 could be an outlet means, as desired, and that the valve construction could be a bidirectional valve construction, as desired.

The housing means 21 can be formed of any suitable material, such as metallic material, and has a stepped cylindrical bore or opening means 29 interrupting one end 30 thereof and defining interconnecting cylindrical sections 31, 32, 33 and 34 disposed in coaxially aligned relation and defining a flat annular shoulder 35 between the sections 31 and 32 and an annular flat shoulder or surface 36 between the sections 32 and 33 thereof whereby the section 33 effectively interrupts the flat surface 36 to define a substantially circular opening 37 that cooperates with the flat annular surface 36 to define the valve seat means 24 as will be apparent hereinafter.

The inlet means 22 has a cross bore portion 38 that intersects with the bore sections 33 and 34 as illustrated and separates the same from each other. The outlet means 23 also has a cross bore portion 39 that interrupts the bore section 32 whereby it can be seen that when the valve means 25 is disposed in a position to permit fluid flow from the inlet means 22 through the opening 37 of the valve seat means 24 into the bore section 32, as illustrated in FIG. 1, such fluid flow into the bore section 32 is adapted to be interconnected to the outlet means 23 by the cross bore 38 as illustrated.

The bore section 34 of the housing means 21 is internally threaded and therefore has internal threads 40 as illustrated for a purpose hereinafter set forth.

The valve means 25 comprises a cylindrical member 41 of any suitable material, such as metallic material, and is adapted to be freely axially movable in the bore section 32 while being centered thereby relative to the valve seat means 24 for a purpose hereinafter set forth.

The member 41 has a flat end surface 42 from which a reduced cylindrical portion 43 extends in coaxial relation with the cylindrical member 41 and has a tapering or frusto-conical throttling part 43' extending coaxially therefrom and being provided with a large circular base 44 adjacent the reduced cylindrical portion 43 and a smaller circular base 45 disposed remote therefrom. The diameter of the large base 44 of the throttling part 43' is the same size as the diameter of the cylindrical portion 43 and is slightly less than the diameter of the opening 37 of the valve seat means 24 so that the throttling part 43' cannot engage against the edge means of the opening 37 when the valve means 25 is in the closed condition as illustrated in FIG. 3.

A flexible, resilient or soft part 46 of the valve means 25 is disposed completely around the reduced cylindrical section 43, such as by being stretched over the same, and comprises an annular member of flexible, resilient or soft sealing material, such as a suitable soft polymeric material, and thereby has opposed flat annular surfaces 47 and 48 with the annular flat surface 47 being disposed against the end surface 42 of the cylindrical member 41 while the other annular flat surface 48 thereof is adapted to engage against the flat annular surface 36 of the valve seat means 24 completely around and outboard of the circular opening 37 thereof to seal closed the valve seat means 24 when the part 47 is disposed against the surface means 36 in the manner illustrated in FIG. 3. In this manner, the flexible part 47 is adapted to be compressed between the surfaces 36 and 42 to seal therebetween. Of course, the flexible member 47 itself could be adhesively secured and thereby sealed to the surface 42 and/or cylindrical section 43 of the member 41, if desired.

The movable valve means 25 has a cylindrical stem 49 of a reduced diameter extending from the smaller base 45 of the throttling portion 43' and is provided with an enlarged cylindrical end portion 50 that is externally threaded so as to have external threads 51 threadedly disposed in the threaded bore section 40 of the housing means 21 in the manner illustrated in FIGS. 1 and 3 so as to permit the valve means 25 to be rotated by the moving means 26 and thereby be axially moved relative to the valve seat means 24 while being centered relative thereto through the threaded relation of the stem 49 with the threaded section 40 of the housing means 21 for purposes hereinafter set forth.

The moving means 26 comprises an electrically operated stepper motor means that is suitably mounted on the end 30 of the housing means 21 and has a rotatable output shaft means 52 extending therefrom into the cylindrical section 32 of the housing means 21 to be operatively interconnected to the valve means 25 in any suitable manner so as to cause rotational movement of the valve means 25 while permitting axial movement between the valve means 25 and the output shaft 52.

For example, the upper end 53 of the cylindrical member 41 is interrupted by a bore or opening means 54 that defines an internal peripheral cylindrical side wall means 56 that is interrupted by a plurality of longitudinally disposed and radially spaced apart slots 57 that comprise spline means of the movable valve means 25.

The output shaft 52 of the stepper motor means 26 has a plurality of outwardly disposed pins or abutments 58 that are respectively received in the spline slots 57 of the member 41 in the manner illustrated in FIG. 2 whereby the pins 58 comprise spline means of the moving means 26 that cooperate with the spline means 57 of the valve means 25 to cause rotational movement of the valve means 25 in unison with rotational movement of the output shaft 52 while permitting axial movement therebetween because of the axial movement being provided by the threaded relation of the threads 51 on the valve means 25 cooperating with the threads 40 of the housing means 21 as previously set forth.

While three cooperating pairs of spline means 57 and 58 have been illustrated and described, it is to be understood that only one pair of spline means 57 and 58 need be provided or any other number of pairs thereof can be provided, as desired.

The stepper motor means 26 is adapted to be substantially hermetically sealed within a casing 59 of the housing means 21 and be electrically interconnected to terminal means 60 by lead means 61, the terminals 60 extending externally of the housing means 21 and extending through an electrically insulating terminal connector 62 that is carried by the casing 59 in a manner well known in the art.

In this manner, electrical signals are adapted to be directed to the terminals 60 for the stepper motor means 26, such as from a microprocessor controlled circuit means (not shown), to cause the stepper motor means 28 to rotationally step the output shaft 52 thereof in a manner to position the valve means 25 relative to the valve seat 24 for a desired purpose and it can be seen that when such electrical current to the stepper motor 26 ceases, the movable valve means 25 will remain in the position at which it was last set by the stepper motor 26 through the threaded relation of the stem 49 with the housing means 21.

Thus, it can be seen that it is a relatively simple method of this invention to make the valve construction 20 of this invention which operates in a manner now to be described.

When it is desired to seal closed the valve seat means 24 of the valve construction 20 with the movable valve means 25 thereof, the stepper motor 26 is operated to rotate the output shaft 52 in the proper direction to cause axial movement of the valve means 25 in a downward direction from the open position illustrated in FIG. 1 to the position illustrated in FIG. 3 wherein the resilient or soft part 46 of the valve means 25 is sealed closed against the flat surface 36 of the valve seat means 24 completely around the opening 37 so as to prevent fluid flow from the inlet means 22 to the outlet means 23, such closed position of the valve means 25 not wedging the frusto-conical throttling part 43' of the valve means 25 in the opening 37 as the large base 44 of the throttling part 43' is slightly smaller than the diameter of the opening 37 so that the same merely remains centered therein in the manner illustrated in FIG. 3.

Since the resilient or soft part 46 of the valve means 24 can be compressed between the valve seat surface 36 and the end surface 42 of the member 41, not only will such compressed condition of the resilient or soft part 46 assure the sealing closed of the valve seat surface 36, but also such compressed condition acts as a takeup means should the stepper motor 26 slightly overrun in its closing operation.

However, when it is desired to interconnect the inlet means 22 of the valve construction 20 with the outlet means 23 thereof, the stepper motor 26 is operated to rotate the output shaft 52 in the proper direction thereof to cause the axial movement of the valve means 25 from the closed position illustrated in FIG. 3 to the desired open position thereof, such as the open position illustrated in FIG. 1, wherein the throttling portion 43' cooperates with the valve seat opening 37 to meter the proper flow rate of fluid through the valve seat means 24 from the inlet means 22 to the outlet means 23. In such open position of the movable valve means 25, it can be seen that the resilient or soft part 46 thereof is sufficiently removed from the opening 37 of the valve seat means 24 that the same does not cause any flow control problems therewith as the throttling part 43' is relatively long and relatively gradual in the shape of the side wall means 43' thereof so as to accurately control the flow rate through the valve seat means 24. And such accurate positioning of the throttling part 43' in the opening 37 of the valve seat means 24 can be provided by the stepper motor 26 receiving the proper electrical signals, such as from a microcomputer means or the like.

Further, it has been found according to the teachings of this invention that by having the housing bore section 32 center the movable valve means 25 relative to the opening 37 of the valve seat means 26 on one side of the valve seat means 26 through the close relationship of the outer diameter of the member 41 with the internal diameter of the bore section 32 and by having the threaded relation between the valve stem 49 and the threaded housing section 34 center the movable valve means 25 relative to the opening 37 of the valve seat means 26 on the other side of the valve seat means 26, the tapering portion 43' of the movable valve means 25 is more accurately centered in the opening 37 of the valve seat means 26 at each axial position of the movable valve means 25 relative to the valve seat means 26 than when the movable valve means is only guided or centered on one side of the valve seat means as in prior known valve constructions. In this manner, it is believed that a more accurate and repeatable fluid flow rate can be provided between the tapering portion 43' of the movable valve means 25 and the opening 37 in the valve seat means 26 for each axial position of the movable valve means 25 relative thereto than when the tapering portion 43' is off center relative to the opening 37, such feature being particularly advantageous when controlling a refrigerant with an expansion valve construction.

In this manner it can be seen that the valve construction 20 of this invention provides a relatively long stem travel of the throttling part 43' relative to the circular opening 37 of the valve seat means 24 to allow for precise control of the resulting fluid restricting orifice between the edge of the circular opening 37 and the portion of the throttling part 43' disposed therein at that time.

It can also be seen that the movable valve means 25 of this invention allows virtually unrestricted fluid flow when in the completely open state thereof which allows the valve construction 20 of this invention to replace check valves when used in a reversing refrigerant system. Also, it can be seen that the valve construction 20 of this invention is suitable for bidirectional fluid flow if desired.

Therefore, it can be seen that this invention not only provides a new valve construction, but also this invention provides a new method of making such a valve construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a valve construction comprising a housing means having an inlet and an outlet and a valve seat means adapted to interconnect said inlet with said outlet, a movable valve means carried by said housing means and being operatively associated with said valve seat means to control fluid flow therethrough from said inlet to said outlet, and moving means carried by said housing means and being operatively interconnected to said movable valve means on one side of said valve seat means to move said movable valve means relative to said valve seat means to control said fluid flow through said valve seat mans, said moving means being adapted to rotate said movable valve means, said moving means having spline means, said movable valve means having spline means interconnected to said spline means of said moving means whereby said moving means is adapted to rotate said movable valve means while permitting axial movement therebetween, the improvement wherein said movable valve means comprises a flexible part for sealing closed said valve seat means when said movable means moves said flexible part against said valve seat means and a throttling part extending beyond said flexible part and into said valve seat means to throttle the fluid flow therebetween when said movable means has moved said flexible part away from said valve seat means and said throttling part has a portion thereof disposed in said valve seat means and wherein said movable valve means has stem extending from said throttling part and having a threaded portion disposed on the other side of said valve seat means, said housing means having a threaded opening means threadedly receiving said threaded portion whereby rotational movement of said movable valve means causes axial movement thereof through the threaded relation of said threaded portion and said threaded opening.

2. A valve construction as set forth in claim 1 wherein said throttling part of said movable valve means is substantially frusto-conical.

3. A valve construction as set forth in claim 2 wherein said throttling part has a large base and a small base separated from each other by a peripheral tapering side wall means thereof, said large base being disposed adjacent said flexible part of said movable valve means.

4. A valve construction as set forth in claim 3 wherein said flexible part of said movable valve means has an annular portion adjacent said large base of said throttling part and extending outboard of the same around the entire large base thereof.

5. A valve construction as set forth in claim 4 wherein said housing means has a substantially flat surface interrupted by a substantially circular opening that defines said valve seat means with said flat surface, said annular portion of said flexible part of said movable valve means having a substantially flat annular surface for engaging said flat surface of said housing means completely around said circular opening to seal closed said valve seat means, said throttling part of said movable valve means being substantially coaxial with said circular opening and having a diameter at said large base thereof smaller than the diameter of said circular opening.

6. A valve construction as set forth in claim 1 wherein said moving means comprises an electrically operated stepper motor.

7. A valve construction as set forth in claim 1 wherein said valve construction comprises an expansion valve means for a refrigerant system.

8. In a valve construction comprising a housing means having an inlet and an outlet and a valve seat means adapted to interconnect said inlet with said outlet, a movable valve means carried by said housing means and being operatively associated with said valve seat means to control fluid flow therethrough from said inlet to said outlet, and an electrically operated stepper motor means carried by said housing means on one side of said valve seat means and being operatively interconnected to said movable valve means on said one side of said valve seat means to move said movable valve means relative to said valve seat means to control said fluid flow through said valve seat means, said stepper motor means having spline means, said movable valve means having spline means interconnected to said spline means of said stepper motor means whereby said stepper motor means is adapted to rotate said movable valve means while permitting said axial movement therebetween, the improvement wherein said movable valve means has a stem extending therefrom and being threadedly interconnected to said housing means on the other side of said valve seat means whereby rotation of said valve means by said stepper motor means causes axial movement of said valve means relative to said valve seat means through the threaded relation of said stem with said housing means.

* * * * *